Jan. 7, 1969   J. E. MAGEE   3,420,337
RAIL FASTENER
Filed Sept. 21, 1967   Sheet 2 of 2
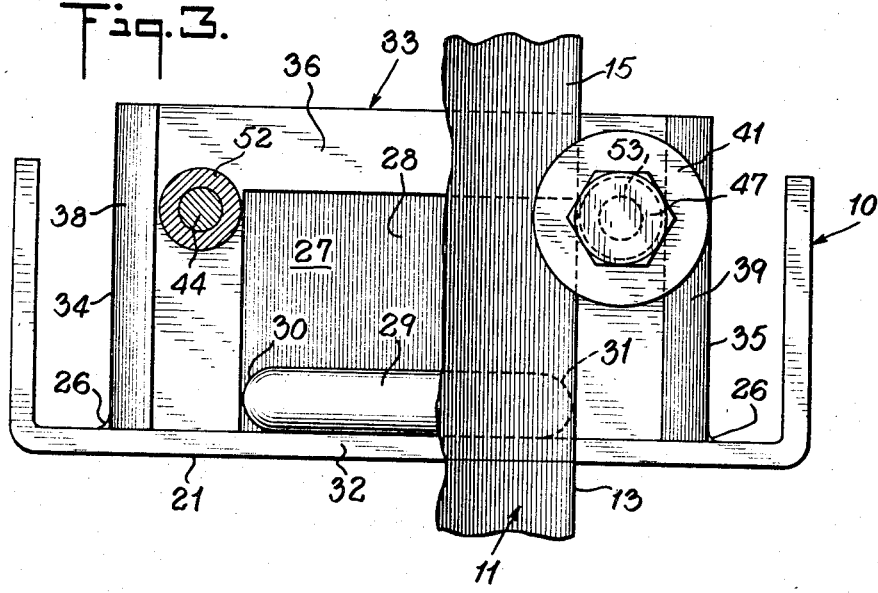
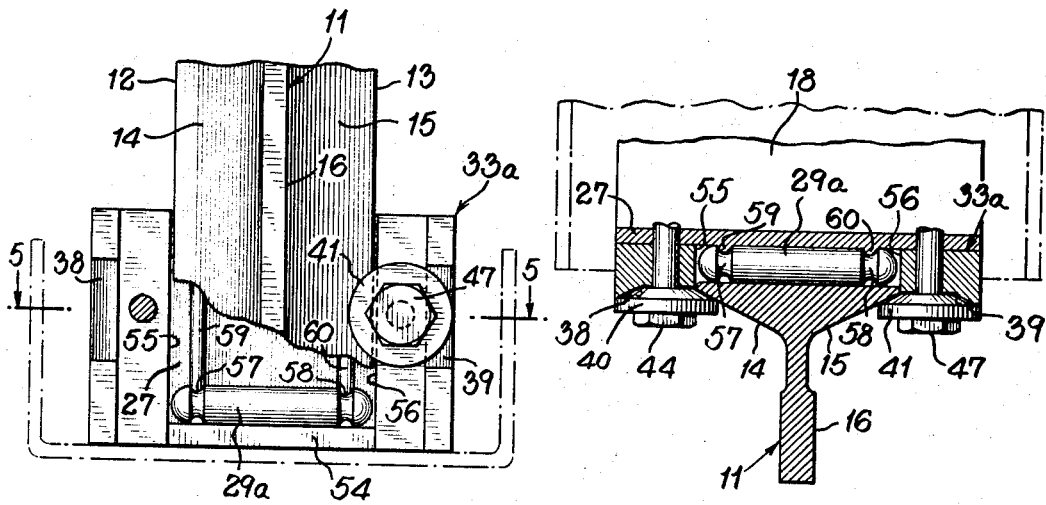
INVENTOR
JOHN E. MAGEE
BY Ward, Haselton, McElhannon
Brook & Fitzpatrick
ATTORNEYS United States Patent Office 3,420,337
Patented Jan. 7, 1969

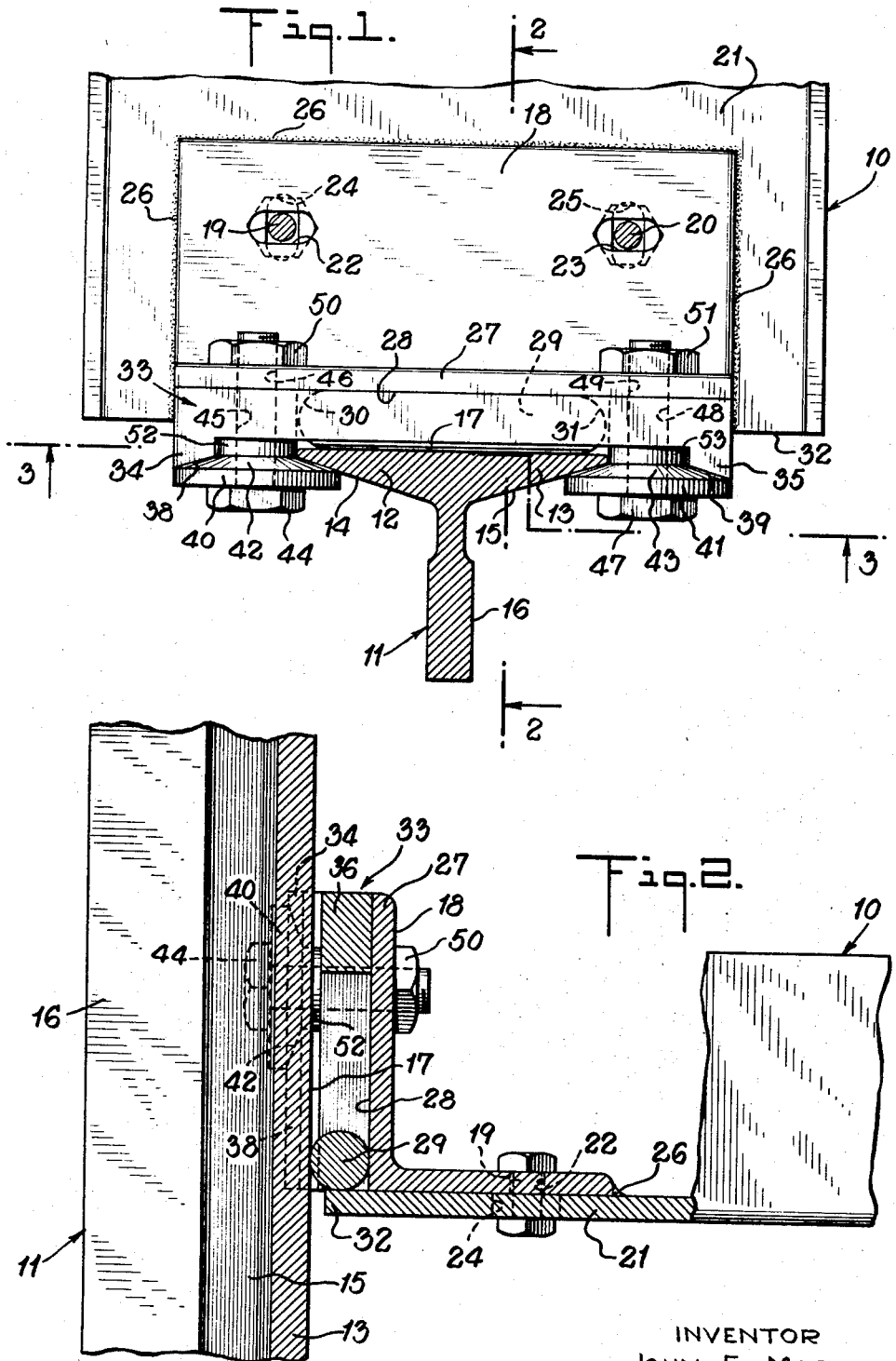

3,420,337
RAIL FASTENER
John E. Magee, Greenburgh, N.Y.
(191 Forest Blvd., Ardsley, N.Y. 10502)
Filed Sept. 21, 1967, Ser. No. 669,505
U.S. Cl. 187—95                                8 Claims
Int. Cl. B66b 7/04

ABSTRACT OF THE DISCLOSURE

An elevator guide rail with tapered flanges is clamped under pressure between a cylindrical bearing roller moveable in the direction of the rail length and supported from the sides of an elevator shaftway and a pair of beveled, rotatable rings in engagement therewith. Rotatable spacer washers on shanks of bolts holding the rings may be used to restrict lateral movement of rail.

---

This invention relates to fastening means for securing to a supporting medium an elongated member subject to longitudinal movement relative to said medium. More particularly, it relates to means for mounting a guide rail or the like.

While not limited thereto, the invention is particularly applicable to fasteners or mounting devices for elevator guide rails in high-rise structures. As pointed out in Patent No. 2,848,077, it is known that high-rise buildings are subject to a measure of settling or compression, such as during the initial period after construction, which causes certain problems with the guide rails for elevator cars and associated equipment. For example, the vertical guide rails in the elevator shafts for the elevator cars are not subject to this compression or settling, and if the mounting brackets or fastenings for the guide rails do not permit relative movement between the rails and the building members, the rails become deformed or misaligned with attendant problems. Said Patent No. 2,848,077 suggests a fastener intended to alleviate such problems, but in use, it has been found that considerable care was required to obtain the correct clamping force. Also, movement of the rail with respect to the fastener varied the clamping force and, in some cases, canting of the fastener and gripping of the rail by a corner thereof.

An object of the present invention is to avoid rail distortion resulting from settling of high-rise building structures.

A further object of the invention is to provide an improved fastening means for securing to a supporting medium any elongated member subject to longitudinal movement.

A still further object of the invention is to provide a fastening means which will not alter its bearing point or clamping force when relative motion occurs between the rail and the structure to which it is attached.

In accordance with the invention, there is provided a fastening means comprising a bearing roller, guide means mountable on the supporting medium for supporting the roller for rolling movement in the direction of movement of the member to be secured, and means for securing the member to the guide means with the member in contact with the roller and aligned with the line of travel thereof.

The invention will be better understood after reading the following detailed description of the presently preferred embodiment thereof with reference to the appended drawings in which:

FIGURE 1 is a top plan view of the fastening means constructed in accordance with the invention and securing an elevator guide rail to a building structural member, certain portions being broken away for clarity;

FIGURE 2 is a sectional view taken along line 2—2 of FIGURE 1;

FIGURE 3 is a sectional view taken along line 3—3 of FIGURE 1;

FIGURE 4 is a fragmentary elevation view of a modified form of a portion of the fastening means; and FIGURE 5 is a sectional view of the embodiment in FIGURE 4 taken along the line 5—5 in FIGURE 4.

Referring to the drawings, there is shown generally at 10 the end of the conventional building structural channel member which, in a known manner, extends from and is rigidly fastened to a building framing member, usually an I beam between adjacent shaftways. The guide rail to be secured to the channel member is shown generally at 11. It will be seen that the guide rail 11 consists of a pair of oppositely disposed, spaced-apart flanges 12 and 13 with tapered surfaces 14 and 15, respectively, which surfaces 14 and 15 extend longitudinally of the guide rail 11. A guiding web 16 extends from between the flanges on the front side thereof. The backs of the flanges are provided with flat surfaces lying in a common plane 17.

A bracket 18 in the form of a 90° angle is secured by means of the bolts 19 and 20 (the heads are broken away for clarity in FIGURE 1) to the web 21 of the channel 10. As best seen in FIGURE 1 of the drawings, the bolts 19 and 20 are disposed, respectively, in slots 22 and 23 in the bracket 18 and in slots 24 and 25 in the web 21. The slots are oriented at right angles to permit during installation of the bracket and rail a degree of adjustment between the bracket 18 and the channel 10. After appropriate adjustment the bracket 18 may be secured permanently to the channel by welding along the edges 26.

It will be understood that if the web 21 of the channel 10 is disposed horizontally in the shaftway, the leg 27 of bracket 18 will be disposed with its surface 28 facing into the shaftway and lying in a vertical plane. This surface may be machined, if desired to provide a smooth, planar bearing surface.

Although in some cases it may be omitted, in which cases the back surface of the rail 11 would bear against the surface 28, preferably, in order to reduce friction, a cylindrical bearing roller 29 is disposed horizontally in rolling contact with the bearing surface 28 of the leg 27 of the bracket. Preferably, the ends 30 and 31 of roller 29 are spherical, but if desired, to restrict tilting or canting of the roller 29, the ends 30 and 31 may be flat.

As best seen in FIGURE 1, the bracket 18 is preferably located on the web 21 such that the edge 32 of the channel web 21 extends a short distance beyond the bearing surface 28 of the bracket leg 27 to limit downward movement of the roller 29, but other means, obvious to those skilled in the art, may be used to limit such movement such as shown and described hereinafter. The bearing roller 29 has a diameter in excess of this short projecting distance. A guide member 33, U-shaped in cross-section, is disposed between the rail 11 and the leg 27 of bracket 18 with its arms 34 and 35 vertically oriented and on opposite sides of the bearing roller 29. This is best seen in FIGURE 3. The horizontal part, 36, of the U-shaped member is located above the bearing roller 29 and has a thickness less than the diameter of the roller 29 so that the rail 11 rides on the roller 29. The U-shaped guide member 33 cooperates with the projecting portion of the web 21 of channel 10 to confine the bearing roller 29 within the space between the guide rail 11 and the leg 27 of bracket 18.

The arms 34 and 35 of the guide member 33 are spaced from but parallel to the edge of the coadjacent flanges 12 and 13. Preferably, each of the arms 34 and 35 has its surface which faces into the shaftway, designated 38 and 39, respectively, beveled or tapered at substantially the same angle as but in the opposite direction to the tapered surfaces 14 and 15 on the corresponding adjacent flange. Such surfaces 38 and 39 extend longitudinally of the member 33 and may extend for the full length thereof as shown or may extend only a short distance on each side of the clamping rings hereinafter described and as shown at 38 and 39 in FIGURE 4.

A pair of clamping rings or washers 40 and 41 are beveled on at least one side, as at 42 and 43, respectively, to provide beveled surfaces which preferably complement the taper of the flanges 12 and 13 and the taper of the surfaces 38 and 39. If desired, such surfaces may be hardened to reduce deformation thereof. As shown, the rings 40 and 41 are disposed, one on each side of the rail 11, bridging the gap between the corresponding arm 34 or 35 and flange 12 or 13, respectively. The ring 40 is secured to the leg 27 of bracket 18 by means of a bolt 44 passing through a central aperture in ring 40 and through corresponding apertures 45 and 46 in both the guide member 33 and the leg 27 of bracket 18. In similar manner the ring 41 is secured to the leg 27 by means of bolt 47 passing through the ring and apertures 48 and 49. Each of the bolts 44 and 47 is secured in place by corresponding nuts 50 and 51.

Preferably, separate spacing washers 52 and 53, respectively, are disposed on each of the bolts 44 and 47 between the corresponding rings 40 and 41 and the guide member 33 although they may be integral with the rings 40 and 41. The radial dimensions of the washers 52 and 53 are such as to limit lateral movement of the rail 11. However, it will be understood that the washers 52 and 53 are free to rotate on the shank of the bolts 44 and 47 when longitudinal displacement should occur between the rail 11 and the mounting assembly.

If it is desired to eliminate the washers 52 and 53 with their advantages, the guide member may be shaped as shown in FIGURES 4 and 5 and may, if desired, include a lower stop 54 for the roller 29a in place of, or in addition to, the projection on the channel web 21, as well as annular grooves 57 and 58 on the roller 29a cooperating with ridges or ribs 59 and 60 to restrict tilting or canting of the roller 29a. As shown in FIGURES 4 and 5, the guide member 33a has the inner sides 55 and 56 with thicker dimensions than those of the corresponding sides of the member 33 so that the washers 52 and 53 may be eliminated and so that such sides confine both the roller 29a and the rail 11 against lateral movement.

It should be apparent that the beveled rings 40 and 41 which secure the rail 11 to the fastener may be thought of as a pair of rollers arranged to engage with line contact the oppositely disposed flanges 12 and 13 on the rail 11 or elongated member and can rotate with movement of the rail 11 thereby making it easier for the rail to move and maintaining the same contact area with the rail 11 as it moves. The rings 40 and 41, functioning as such rollers, cooperate in opposition to the bearing roller 29 which substantially eliminates friction between the rail back surface in the plane 17 and the supporting member. The bearing roller 29 is supported for rolling movement in the direction of movement of the rail 11.

Accordingly, the fastening means of the invention securely holds the rail 11 against lateral movement and movement away from the supporting member and yet permits the rail 11 to move relatively easily with respect to the supporting member in a direction longitudinally of the rail 11. In addition, the tightening of the fastening means is not critical, and during movement of the rail 11 substantially the same area of contact is maintained between the clamping or beveled rings 40 and 41 and the surfaces 14 and 15.

While the invention has been described with reference to the mounting of an elevator guide rail, it should be apparent that it is applicable to the mounting or fastening of any longitudinal member relative to a supporting surface or medium wherein expansion or contraction or relative longitudinal movement of the rail relative to the supporting medium is anticipated.

What is claimed is:

1. Means for securing to a supporting medium an elongated member subject to longitudinal movement relative to said medium and having oppositely disposed tapered surfaces extending longitudinally thereof, said means comprising a bearing roller, means mountable on said medium for supoprting and guiding said roller for rolling movement in the direction of said longitudinal movement, and means for securing said elongated member to said supporting means with said member in contact with said roller and with its length aligned with said direction comprising a pair of rings each having a beveled surface and means for rotatably mounting said rings on said supporting and guiding means and with each of said rings in contact with said supporting means and with its beveled surface in contact with a tapered surface on said member.

2. Means as set forth in claim 1 wherein said supporting means has a pair of spaced-apart, oppositely disposed tapered surfaces extending in said direction, the taper of said last-mentioned surfaces being substantially the same as the taper of said surfaces on said member and wherein each said ring is mounted with its beveled surface in contact with one of the tapered surfaces on said supporting means.

3. Means as set forth in claim 2 wherein the beveled surfaces on said rings are complementary to the tapered surfaces on said member and said supporting means and have line contact therewith.

4. Means as set forth in claim 3 wherein said member has side edges adjacent said tapered surfaces thereon and further comprising bearing means rotatably mounted on said supporting means and engageable with said side edges.

5. In combination with an elongated elevator guide rail having a pair of tapered flanges with a back surface, with a front surface with an intermediately disposed upstanding guide portion extending therefrom and with a pair of side edges, fastening means for mounting said rail on a supporting medium comprising a supporting and guiding member having a channel between a pair of arms extending outwardly from the supporting medium and respectively adjacent said side edges, said rail being disposed with its back surface facing said supporting medium and with its side edges adjacent said arms, a roller bearing mounted in said channel between said arms, in contact with said back surface and for movement longitudinally of said rail, each of said arms having outwardly facing tapered surfaces adjacent the tapered surfaces on said flanges, each of said first-mentioned tapered surfaces having substantially the same, but opposite, taper as the tapered surface of the flange adjacent thereto, a pair of rings having beveled surfaces and means rotatably mounting said rings with the beveled surface of one ring bearing against an adjacent pair of said tapered surfaces and with the beveled surface of the other said ring bearing against the other adjacent pair of said tapered surfaces.

6. The combination as set forth in claim 5 wherein the beveled surfaces on said rings are complementary to the tapered surfaces on said flanges and said arms.

7. The combination as set forth in claim 6 in which said fastening means further comprises bearing means rotatably mounted on said supporting member and engageable with the side edges of said rail.

8. In combination with an elongated elevator guide rail having a pair of tapered flanges with a back surface, with a front surface with an intermediately disposed upstanding guide portion extending therefrom and with a pair of side edges, fastening means for mounting said rail on a supporting medium comprising a supporting and guiding member having a channel between a pair of arms extending outwardly from the supporting medium and respectively adjacent said side edges, said rail being disposed with its back surface facing said supporting medium and with its side edges adjacent said arms, each of said arms having outwardly facing tapered surfaces adjacent the tapered surfaces on said flanges, each of said first-mentioned tapered surfaces having substantially the same, but opposite, taper as the tapered surface of the flange adjacent thereto, a pair of rings having beveled surfaces and means rotatably mounting said rings with the beveled surface of one ring bearing against an adjacent pair of said tapered surfaces and with the beveled surface of the other said ring bearing against the other adjacent pair of said tapered surfaces.

References Cited

UNITED STATES PATENTS

| | | | |
|---|---|---|---|
| 2,463,215 | 3/1949 | Strachan | 187—95 |
| 2,848,077 | 8/1958 | Tofanelli | 187—95 |

EVON C. BLUNK, *Primary Examiner.*

H. C. HORNSBY, *Assistant Examiner.*